(12) United States Patent
Natarajan et al.

(10) Patent No.: US 7,375,167 B2
(45) Date of Patent: May 20, 2008

(54) HYDROLYSIS-RESISTANCE COMPOSITION

(75) Inventors: Kavilipalayam M. Natarajan, Holmdel, NJ (US); Stephen J. Hanley, Lebanon, NJ (US)

(73) Assignee: BASF SE, Ludwigsgafen (DE)

( * ) Notice: Subject to any disclaimer, the term of this patent is extended or adjusted under 35 U.S.C. 154(b) by 550 days.

(21) Appl. No.: 11/124,730

(22) Filed: May 9, 2005

(65) Prior Publication Data
US 2006/0252889 A1 Nov. 9, 2006

(51) Int. Cl.
C08L 67/00 (2006.01)
C08L 63/00 (2006.01)

(52) U.S. Cl. ................. 525/438; 525/449; 525/533
(58) Field of Classification Search ............... 525/438, 525/449, 533
See application file for complete search history.

(56) References Cited

U.S. PATENT DOCUMENTS

| | | | |
|---|---|---|---|
| 3,637,898 A | 1/1972 | Herwig | |
| 3,859,248 A | 1/1975 | Jackson, Jr. et al. | |
| 3,886,104 A | 5/1975 | Borman et al. | |
| 4,111,893 A | 9/1978 | Gasman et al. | |
| 4,125,571 A | 11/1978 | Scott et al. | |
| 4,140,670 A | 2/1979 | Charles et al. | |
| 4,211,689 A | 7/1980 | Borman | |
| 4,212,791 A | 7/1980 | Avery et al. | |
| 4,246,378 A | 1/1981 | Kometani et al. | |
| 4,276,208 A | 6/1981 | Ogawa et al. | |
| 4,351,758 A | 9/1982 | Lu et al. | |
| 4,361,625 A * | 11/1982 | Beckmann et al. | 428/412 |
| 4,429,004 A | 1/1984 | Breitenfellner | |
| 4,429,020 A | 1/1984 | Luch | |
| 4,435,546 A | 3/1984 | Bier et al. | |
| 4,438,233 A | 3/1984 | Lee | |
| 4,444,931 A | 4/1984 | Lu et al. | |
| 4,486,561 A | 12/1984 | Chung et al. | |
| 4,486,564 A | 12/1984 | Deyrup | |
| 4,499,219 A | 2/1985 | Buxbaum et al. | |
| 4,506,043 A | 3/1985 | Ogawa et al. | |
| 4,530,953 A | 7/1985 | Yoshida | |
| 4,533,679 A | 8/1985 | Rawlings | |
| 4,536,425 A | 8/1985 | Hekal | |
| 4,539,352 A | 9/1985 | Chung et al. | |
| 4,540,729 A | 9/1985 | Williams | |
| 4,548,964 A | 10/1985 | Yoshida et al. | |
| 4,548,978 A | 10/1985 | Garrison, Jr. | |
| 4,551,485 A | 11/1985 | Ragan et al. | |
| 4,562,216 A | 12/1985 | Kishida et al. | |
| 4,603,092 A | 7/1986 | Luch | |
| 4,615,946 A | 10/1986 | Temple | |
| 4,617,618 A | 10/1986 | Baciu et al. | |
| 4,618,440 A | 10/1986 | Steinberg et al. | |
| 4,623,562 A | 11/1986 | Breitenfellner et al. | |
| 4,663,373 A | 5/1987 | Ravichandran et al. | |
| 4,670,199 A | 6/1987 | Montet et al. | |
| 4,687,875 A | 8/1987 | Dunkle et al. | |
| 4,693,941 A | 9/1987 | Ostapchenko | |
| 4,699,942 A | 10/1987 | Weaver et al. | |
| 4,709,305 A | 11/1987 | McMahan et al. | |
| 4,728,588 A | 3/1988 | Noding et al. | |
| 4,729,854 A | 3/1988 | Miyata et al. | |
| 4,731,404 A | 3/1988 | Haylock et al. | |
| 4,732,921 A | 3/1988 | Hochberg et al. | |
| 4,740,580 A | 4/1988 | Merck et al. | |
| 4,753,975 A | 6/1988 | Vanderkool, Jr. | |
| 4,753,980 A | 6/1988 | Deyrup | |
| 4,795,771 A | 1/1989 | Yoshihara | |
| 4,840,984 A | 6/1989 | Somemiya et al. | |
| 4,879,328 A | 11/1989 | Karasawa et al. | |
| 4,879,355 A | 11/1989 | Light et al. | |
| 4,880,876 A | 11/1989 | Hub et al. | |
| 4,933,429 A | 6/1990 | McCracken et al. | |
| 4,990,549 A | 2/1991 | Delvin et al. | |
| 4,997,938 A | 3/1991 | Cantatore et al. | |
| 4,999,388 A | 3/1991 | Okamoto | |
| 5,028,647 A | 7/1991 | Haylock et al. | |
| 5,028,649 A | 7/1991 | Efner | |

(Continued)

FOREIGN PATENT DOCUMENTS

EP 0043797 B2 1/1991

OTHER PUBLICATIONS

Abstract of JP63003055A Entitled "Insert Molded Article" 1 page; Naruyama; Jan. 8, 1988.
Abstract of EP000457085A2 Entitled "Glass Fiber Reinforced Polycarbonate/Polyester Blends" 1 page; Gallucci; Nov. 21, 1991.
Absrtact of EP000462378A2 Entitled "Polythylene Terephthalate Compostion" 1 page; Nakano; Dec. 27, 1991.
Abstract of JP401103654A Entitled "Resin Compostion for Connects" 1 page; Mori; Apr. 20, 1989.
Abstract of JP401144452A Entitled "Polyester Composition" 1 page; Yoshihara Jun. 6, 1989.
Abstract of JP401174554A Entitled "Halogen-Containing Polyester Resin Compostion And Covered Wire Therefrom" 1page; Nakane; Jul. 11, 1989.

(Continued)

Primary Examiner—Michael J Feely
(74) Attorney, Agent, or Firm—Fernando A. Borrego

(57) ABSTRACT

A composition for forming an article having an improved resistance to hydrolysis is disclosed. The composition comprises a polyalkylene terephthalate and/or polyester thereof, a triglyceride, an epoxy component, and a plasticizer. The polyalkylene terephthalate has terminal carboxyl groups and hydroxyl groups and internal ester linkages. The triglyceride has at least one acid component with 6 to 30 carbon atoms and at least one epoxy group for reacting with the carboxyl groups. The epoxy component has internal aromatic groups and at least one terminal epoxy group for reacting with the carboxyl groups. The plasticizer comprises an esterification product of a polyoxyalkylene glycol with 1 to 20 carbon atoms and an aliphatic carboxylic acid with 1 to 25 carbon atoms for improving melt flow properties and for reducing hydrolysis of the composition.

19 Claims, No Drawings

U.S. PATENT DOCUMENTS

| | | |
|---|---|---|
| 5,034,440 A | 7/1991 | Nakane et al. |
| 5,047,450 A | 9/1991 | Wilder |
| 5,057,565 A | 10/1991 | Noding et al. |
| 5,075,354 A | 12/1991 | Mitsuuchi et al. |
| 5,081,169 A | 1/1992 | Bohen et al. |
| 5,091,457 A | 2/1992 | Efner |
| 5,095,089 A | 3/1992 | Mori et al. |
| 5,100,717 A | 3/1992 | Nedzu et al. |
| 5,104,720 A | 4/1992 | Sano et al. |
| 5,122,551 A | 6/1992 | Gallucci et al. |
| 5,124,435 A | 6/1992 | Mori et al. |
| 5,132,353 A | 7/1992 | Wallace |
| 5,135,971 A | 8/1992 | Steiert et al. |
| 5,149,734 A | 9/1992 | Fisher et al. |
| 5,162,412 A | 11/1992 | Liu |
| 5,164,434 A | 11/1992 | Liwak et al. |
| 5,169,885 A | 12/1992 | Hanayama et al. |
| 5,185,426 A | 2/1993 | Verheijen et al. |
| 5,219,911 A | 6/1993 | Minnick |
| 5,236,988 A | 8/1993 | Doyama et al. |
| 5,242,967 A | 9/1993 | Minnick |
| 5,246,999 A | 9/1993 | Wielgosz et al. |
| 5,258,434 A | 11/1993 | Hanabusa |
| 5,302,645 A | 4/1994 | Nakano et al. |
| 5,326,793 A | 7/1994 | Gallucci et al. |
| 5,371,123 A | 12/1994 | Gallucci et al. |
| 5,378,769 A | 1/1995 | George et al. |
| 5,399,605 A | 3/1995 | Yoshihara et al. |
| 5,407,994 A | 4/1995 | Sarabi et al. |
| 5,430,076 A | 7/1995 | Matsumoto et al. |
| 5,500,261 A | 3/1996 | Takei et al. |
| 5,589,530 A | 12/1996 | Walsh |
| 5,596,049 A | 1/1997 | Gallucci et al. |
| 5,624,987 A | 4/1997 | Brink et al. |
| 5,700,857 A | 12/1997 | Mukohyama |
| 5,712,336 A | 1/1998 | Gareiss et al. |
| 5,719,092 A | 2/1998 | Arrington |
| 5,731,390 A | 3/1998 | Helmond |
| 5,739,188 A | 4/1998 | Desai |
| 5,744,554 A | 4/1998 | Pfaendner et al. |
| 5,747,606 A | 5/1998 | Pfaendner et al. |
| 5,759,687 A | 6/1998 | Arpin et al. |
| 5,780,539 A | 7/1998 | Tung |
| 5,811,480 A | 9/1998 | Kirchmeyer et al. |
| 5,859,073 A | 1/1999 | Pfaendner et al. |
| 5,865,530 A | 2/1999 | Weber |
| 5,910,365 A | 6/1999 | Castellani |
| 5,915,831 A | 6/1999 | Bonin et al. |
| 5,916,496 A | 6/1999 | Weber |
| 5,965,648 A | 10/1999 | Brink et al. |
| 5,990,213 A | 11/1999 | Kobayashi |
| 5,998,005 A | 12/1999 | Kanno |
| 6,057,016 A | 5/2000 | Al Ghatta et al. |
| 6,214,915 B1 | 4/2001 | Avakian et al. |
| H1987 H | 8/2001 | Brink et al. |
| 6,281,283 B1 | 8/2001 | Heitz et al. |
| 6,305,908 B1 | 10/2001 | Hermann et al. |
| 6,316,518 B1 | 11/2001 | Phipps et al. |
| 6,447,913 B1 | 9/2002 | Watanabe et al. |
| 6,503,969 B1 | 1/2003 | Klatt et al. |
| 6,506,852 B2 | 1/2003 | Yoshimura et al. |
| 6,521,326 B1 | 2/2003 | Fischer et al. |
| 6,538,054 B1 | 3/2003 | Klatt et al. |
| 6,551,688 B2 | 4/2003 | Moskala et al. |
| 6,569,991 B2 | 5/2003 | Nichols et al. |
| 6,656,988 B1 | 12/2003 | Fischer et al. |
| 6,706,824 B1 | 3/2004 | Pfaendner et al. |
| 6,709,731 B2 | 3/2004 | Murschall et al. |
| 6,716,899 B1 | 4/2004 | Klatt et al. |
| 6,730,406 B2 | 5/2004 | Murschall et al. |
| 6,762,235 B2 | 7/2004 | Takenaka et al. |
| 6,794,432 B2 | 9/2004 | Murschall et al. |
| 6,803,082 B2 | 10/2004 | Nichols et al. |
| 6,803,442 B2 | 10/2004 | Fujimaki et al. |
| 2001/0018476 A1 | 8/2001 | Murschall et al. |
| 2002/0077405 A1 | 6/2002 | Edwards et al. |
| 2002/0099150 A1 | 7/2002 | Kumazawa et al. |
| 2002/0128358 A1 | 9/2002 | Murschall et al. |
| 2002/0156157 A1 | 10/2002 | Edwards et al. |
| 2002/0156158 A1 | 10/2002 | Edwards et al. |
| 2002/0187328 A1 | 12/2002 | Murschall et al. |
| 2002/0188092 A1 | 12/2002 | Moskala et al. |
| 2003/0013792 A1 | 1/2003 | Muhlfeld et al. |
| 2003/0017317 A1 | 1/2003 | Murschall et al. |
| 2003/0032704 A1 | 2/2003 | Murschall et al. |
| 2003/0039783 A1 | 2/2003 | Stafford et al. |
| 2003/0069339 A1 | 4/2003 | Takenaka et al. |
| 2003/0083409 A1 | 5/2003 | Bienmuller et al. |
| 2003/0216500 A1 | 11/2003 | McKenna |
| 2004/0034126 A1 | 2/2004 | Garrison et al. |
| 2004/0127609 A1 | 7/2004 | Strand et al. |
| 2004/0147655 A1 | 7/2004 | Sawaki et al. |
| 2004/0152810 A1 | 8/2004 | Takenaka et al. |
| 2004/0180995 A1 | 9/2004 | Enlow et al. |
| 2004/0192857 A1 | 9/2004 | Borer et al. |

OTHER PUBLICATIONS

Abstract of JP401174555A Entitled "Production of Aromatic Polyester Resin Composition" 1page; Karasawa; Jul. 11, 1989.

Abstract of JP401221448A Entitled "Hydrolysis-Resistant Polyester Composition" 1 page; Kato; Sep. 4, 1989.

Abstract of JP402158658A Entitled "Polybutylene Terephthalate Resin Composition FOr Connector" 1 page; Mori; Jun. 19, 1990.

Abstract of JP402286739A Entitled "Polybutylene Terephthalate resin Composition" 1page; Kawamura; Nov. 26, 1990.

Abstract of JP403041148A Entitled "Polybutylene Telephalate Resin Composition" 1page;Yoshida; Feb. 21, 1991.

Abstract of JP403084059A Entitled "Polyalkylene Terephthalate Resin Composition" 1page; Mori; Apr. 9, 1991.

Abstract of JP403287657A Entitled "Polybutylene Terephthalate Resin Composition" 1 page; Kawamura; Dec. 18, 1991.

Abstract of JP403294353A Entitled "Thermoplastic Polyester Resin Composition"1 page; Tomita; Dec. 25, 1991.

Abstract of JP404007351A Entitled "Polyethylene Terephthalate Composition" 1 page; Nakano; Jan. 10, 1992.

Abstract of JP405086267A Entitled "Liquid Crystal Polyester Resin Composition" 1 page; Akiyama; Apr. 6, 1993.

Abstract of JP40518668A Entitled "Tubular Molded Material" 1 page; Goto; Jul. 27, 1993.

Abstract of JP406212065A Entitled "Ployester Resin Composition" 1 page; Shirai; Aug. 02, 1994.

Abstract of JP406263970A Entitled "Glass-Filled Flame-Retardant Polyester Compostion With Improved Color" 1 page; Gallucci; Sep. 20, 1994.

Abstract of JP407179734A Entitled "Thermoplastic Resin Composition" 1 page; Tomita; Jul. 18, 1995.

Abstract of JP407267690A Entitled "Fiber Size For Glass Fiber and Glass Fiber Reinforcing Resin"1 page; Ozaki; Oct. 17, 1995.

Abstract of JP408198958A Entitled "Production Of Polybutylene Terephthalate Polymer" 1 page; Matsuki; Aug. 6, 1996.

Abstract of JP40953005A Entitled "Polybutylene Tereththalate Resin Composition Pellet Excellent in Molding Stability" 1 page; Fujie; Feb. 25, 1997.

Abstract of JP02000212410A Entitled "Flame-Retarded Polyester Resin Pomposition" 1 page; Higashijima; Aug. 2, 2000.

Abstract of JP2004204171A Entitled "Flame-Retardant Resin Composition For Sheathed Electric Wire" 1 page; Takayama; Jul. 22, 2004.

Abstract of JP355052341A Entitled "Polyethylene Terephthalate Resin Composition" 1 page; Sakai; Apr. 16, 1980.

Abstract of JP359124949A Entitled "Master Pellet Composition Containing Nucleating Agent For Polyester Resin And Production Thereof" 1 page; Suzuki; Jul. 19, 1984.

Abstract of JP359204656A Entitled "Thermoplastic Polyester Resin Composition" 1 page; Hirobe; Nov. 20, 1984.

Abstract of JP359217754A Entitled "Thermoplastic Polyester Resin Compostion" 1 page; Hirobe; Dec. 7, 1984.

Abstract of JP360147432A Entitled "Production Of Resin For Coating" 1 page; Kato; Sep. 03, 1985.

Abstract of JP360219255A Entitled "Polyester Resin Composition " 1 page; Maruyama; Nov. 01, 1985.

Abstract of JP360219256A Entitled "Polyester Resin Composition" 1 page; Maruyama; Nov. 01, 1985.

Abstract of JP360235841A Entitled "Preparation Of Thermoplastic Polyester Resin Composition" 1 page; Fukumoto; Nov. 22, 1985.

Abstract of JP361034053A Entitled "Production of Polyester Moslding" 1 page; Sato; Feb. 18, 1986.

Abstract of JP361126165A Entitled "Polyethylene Terephthalate Film" 1 page; Kawakami; Jun. 13, 1986.

Abstract of JP361243854A Entitled "Polyester Copolmer Composition For Injection Molding" 1 page; Hirobe; Oct. 30, 1986.

Abstract of EP0334620 Entitled "Polyester Resin, Process For Producing the same and Moldings Produced Therefrom" 2 pages; POLYPLASTICS; Sep. 27, 1989.

Abstract of EP000449135A1 Entitled "Flame Retardant Resin Composition" 2 pages; Takahashi; Oct. 2, 1991.

Abstract of EP000073042A1 Entitled "Polyester Composition" 2 pages; Jones; Mar. 2, 1983.

Abstract of EP00081144A2 Entitled "Heat-Shapable Sheet-Like Semi-Finished Products Of Fiber-Reinforced Polyethylene Terephthalate" 2 pages; Seiler; Jun. 15, 1983.

Abstract of JP362112652A Entitled "Sealing Polyester Resin Composition" 2 pages; Okamoto; May 23, 1987.

Abstract of WO008503717A1 Entitled "Fast Crystallizing Polyester Resin Containing Three-Component Crystallization System" 2 pages; Garrison; Aug. 29, 1985.

Abstract of WO9424188 Entitled "Increasing The Molecular Weight Of Poleyesters And Premix Useful For This Process" 2 pages; Ciba-Geigy AG; Oct. 27, 1994.

Abstract of JP54066175A Entitled "Fixing Structure of Bezel" 2 pages; Citizen Watch; May 28, 1979.

Abstract of JP54098646A Entitled "Securing Structure Of Watch Glass" 2 pages; Citizen Watch; Aug. 03, 1979.

Abstract of JP54098647A Entitled "Securing Structure Of Watch Glass" 2 pages; Citiven Watch; Aug. 03, 1979.

Abstract of JP54101360A Entitled "Structure Of Glass Parts Of Watch Cases" 2 pages; Citizen Watch; Aug. 09, 1979.

Abstract of JP2000305064A Entitled "Protective For Liquid Crystal Module And Liquid Crystal Module With Protective Sheet And Method For Protecting Liquid Crystal Display Part of Liquid Crystal Module" 2 pages; Nitto Denko; Nov. 02, 2000.

Abstract of JP2001191840A Entitled "After-Fitted Lighting System For Automobile" 2 pages; Murakami; Jul. 17, 2001.

Abstract of JP10053065A Entitled "Mounting Structure Of Lamp Bezel" 2 pages; Suzuki Motor; Feb. 24, 1998.

Abstract of JP2000280665A Entitled "Card Base And Its Manufacture" 2 pages; Rhythm Watch; Oct. 10, 2000.

Abstract of JP09292474A Entitled "Hologram Display Plate Structure Of Electronic Apparatus" 2 pages;Citizen Watch; Nov. 11, 1997.

Abstract of JP198866A Entitled "Dial For Timepiece And Its Production Method" 2 pages; Citizen Watch; Aug. 01, 1995.

Abstract of JP07173325A Entitled "Antistatic Resin Composition" 2 pages; Citizen Watch; Jul. 11, 1995.

Abstract of JP03081370A Entitled "Timepiece Part" 2 pages; Cizin Watch; Apr. 5, 1991.

Abstract of JP01234216A Entitled "Outer Covering of Wristwatch With Highspecific-Gravity Resin Composition" 2 pages; Citizen Watch; Sep. 19, 1989.

Abstract of JP63068660A Entitled "Electromagnetic Wave Shielding Polybutylene Terephthalate Resin Composition" 2 pages; Mitsubishi Gas; Mar. 28, 1988.

Abstract of JP56004649A Entitled "Meter Plate" 2 pages; Unitika Ltd; Jan. 19, 1981.

* cited by examiner

HYDROLYSIS-RESISTANCE COMPOSITION

BACKGROUND OF THE INVENTION

1. Field of the Invention

The subject invention relates to a composition for forming an article and more specifically to an article having improved resistance to hydrolysis.

2. Description of the Prior Art

Articles based upon polyester compositions are well known to those skilled in the art. However, these polyester compositions have internal ester linkages that are susceptible to hydrolysis. Hydrolysis is a chemical reaction in which water molecules or its ions split chemical bonds and break a substance into smaller molecules. Articles that are exposed to humid conditions have a greater likelihood of undergoing hydrolysis. Articles that undergo hydrolysis tend to degrade, which is illustrated by worsened physical properties after hydrolysis than as before hydrolysis.

The polyester compositions of the related art generally include a polyalkylene terephthalate and/or polyester thereof and various other additives, such as plasticizers, impact modifiers, lubricants, nucleating agents, epoxy components, and the like. More specifically, one related art composition includes a polyester, an impact modifier, and a compound having at least one functional group selected from the class consisting of anhydrides, epoxides, and hydroxyls. The epoxides may include epoxy formed from bisphenol A or epoxidized linseed oil. Further, the composition includes plasticizers and nucleating agents. However, the related art composition does not include the unique combination of the subject invention to provide hydrolysis resistance.

The related art compositions are characterized by one or more inadequacies. Specifically, the related art compositions are prone to hydrolysis and articles formed therefrom have physical properties that degrade unsatisfactorily when exposed to conditions favorable to hydrolysis. Accordingly, it would be advantageous to provide a composition that is based on a polyester having internal linkages that is hydrolysis-resistant.

SUMMARY OF THE INVENTION AND ADVANTAGES

The subject invention provides a composition for forming an article having an improved resistance to hydrolysis. The composition comprises a polyalkylene terephthalate and/or polyester thereof, a triglyceride, an epoxy component, and a plasticizer. The polyalkylene terephthalate has terminal carboxyl groups and hydroxyl groups and internal ester linkages. The triglyceride has at least one acid component with 6 to 30 carbon atoms and at least one epoxy group for reacting with the carboxyl groups. The epoxy component has internal aromatic groups and at least one terminal epoxy group for reacting with the carboxyl groups. The plasticizer comprises an esterification product of a polyoxyalkylene glycol with 1 to 20 carbon atoms and an aliphatic carboxylic acid with 1 to 25 carbon atoms for improving melt flow properties and for reducing hydrolysis of the composition.

The subject invention provides a unique combination of the polyalkylene terephthalate and epoxy containing components to produce articles that have improved resistance to hydrolysis. When combined as taught by the subject invention, the carboxyl groups are capped with hydrophobic groups that act as a buffer about the internal ester linkages and reduce the likelihood of undergoing hydrolysis. Further, the epoxy containing components react in such a manner to provide ether linkages between the polyalkylene terephthalate and the epoxy containing components. The ether linkages are also hydrophobic which further reduces the likelihood of the composition or article undergoing hydrolysis.

DETAILED DESCRIPTION OF THE INVENTION

A composition for use in forming an article is disclosed. More specifically, the article has an improved resistance to hydrolysis. As understood by those skilled in the art, hydrolysis is a chemical reaction in which water molecules or its ions split chemical bonds and break a substance into smaller molecules. This is particularly problematic for articles exposed to humid conditions or exposed to sources of water. Articles that undergo hydrolysis have reduced physical properties that shorten the lifespan of the articles and that may result in other problems arising during the use of the article. The improved resistance to hydrolysis substantially maintains the physical properties of the article even when exposed to such conditions.

The subject invention is particularly useful for automotive applications, electrical applications, household applications, and industrial applications. Illustrative examples of automotive applications include the following articles: housings and functional parts in electric drives, housings and mountings for various electrical and electronic components, windscreen wiper arms, door handles, headlamp structures, mirror systems, electrical connectors, sun-roof components, housings for locking systems. Illustrative examples of electrical applications include the following articles: plug-in connectors, capacitor pots in coil formers, lamp parts, PC fans, and power supply components. Illustrative examples of household applications include the following articles: exterior surfaces for appliances, such as irons, deep fryers, coffee machines, bristles for brushes, such as toothbrushes and hair brushes. Illustrative examples of industrial applications include the following articles: control units and shafts of pumps, housing for meters, values, and pumps, and camera and optical devices.

The composition formed according to the subject invention generally comprises reactive components and inert components. The reactive components react with one another; whereas the inert components are present facilitate the processing of the composition. The reactive components include a polyalkylene terephthalate and/or polyester thereof, a triglyceride, an epoxy component, and fibers. The inert components include plasticizers, lubricants, antioxidants, nucleating agents, pigments and the like. In connection with the subject invention, inert is defined as tending not to effect the hydrolysis resistance of the composition as described further below. It is to be appreciated that certain components, such as plasticizer or lubricants, depending upon the specific composition, may react with various other components.

The polyalkylene terephthalate has terminal carboxyl groups and hydroxyl groups and internal ester linkages and is generally based on the reaction of aromatic dicarboxylic acids and an aliphatic or aromatic dihydroxy compound. The viscosity number of the polyalkylene terephthalate is generally in the range from 70 to 220, preferably from 80 to 160 (measured in a 0.5% strength by weight solution in a mixture of phenol and o-dichlorobenzene (weight ratio 1:1) at 25° C. The polyalkylene terephthalate also preferably has a content of carboxyl end groups up to 100 meq/kg, preferably up to 50 meq/kg, and especially up to 40 meq/kg of the polyalkylene terephthalate. The content of carboxyl end groups is generally determined by titration methods (eg. potentiometry).

Preferred dicarboxylic acids are, for example, terephthalic acid, 2,6-naphthalenedicarboxylic acid, isophthalic acid, and mixtures thereof. The more preferred dicarboxylic acid is terephthalic acid. Preferred aliphatic dihydroxy compounds are diols with from 2 to 10 carbon atoms, in particular 1,2-ethanediol, 1,4-butanediol, 1,6-hexanediol, 1,4-hexanediol, 1,4-cyclohexanediol, 1,4-cyclohexanedimethylanol, neopentyl glycol, and mixtures thereof. The more preferred dihydroxy compound is 1,4-butanediol.

The polyalkylene terephthalate is preferably selected from at least one of poly(butylene terephthalate) (PBT) and poly(ethylene terephthalate) (PET). However, the polyalkylene terephthalate may also include a blend of polycarbonates with either the PBT or the PET. In the most preferred embodiment, the polyalkylene terephthalate is PBT and/or polyesters thereof.

The polyalkylene terephthalate is present in an amount of from 40 to 90 parts by weight based on 100 parts by weight of the composition. Preferably, the polyalkylene terephthalate is present in an amount of from 45 to 75 parts by weight, and most preferably from 50 to 70 parts by weight, both based on 100 parts by weight of the composition.

The internal ester linkages of the polyalkylene terephthalate are prone to undergo hydrolysis. Further, the terminal carboxyl groups acts as a catalyst for encouraging the polyalkylene terephthalate to undergo hydrolysis. Therefore, it would be advantageous to reduce the tendency of the polyalkylene terephthalate to undergo hydrolysis.

The triglyceride has at least one acid component with 6 to 30 carbon atoms and at least one epoxy group for reacting with the carboxyl groups of the polyalkylene terephthalate. Preferably, at least one of the acid components is epoxidized, however, the glyceride may be epoxidized in addition to or in place of the acid component. The triglyceride preferably has a number-average molecular weight of from about 400 to about 1,000. The reaction of the epoxy group with the carboxyl group prevents the carboxyl group from acting as the catalyst for the hydrolysis. Further, this reaction results in ether linkages that are less prone to undergo hydrolysis. Since the epoxy group has reacted with the polyalkylene terephthalate, the acid component acts as a buffer to the ester linkages in the polyalkylene terephthalate to further reduce the likelihood of the composition undergoing hydrolysis.

The acid component of the triglyceride is selected from at least one of linseed oil, soybean oil, sunflower seed oil, safflower oil, hempseed oil, tung oil, oiticica oil, corn oil, sesame oil, cottonseed oil, castor oil, olive oil, peanut oil, rapeseed oil, coconut oil, babassu oil, and palm oil. It is to be appreciated that various combination and mixtures of the above acid components may also be utilized with the subject invention. These acid components are derived from fatty acids that are generally hydrophobic, which increases the buffering effect and further stabilizes the composition. More preferably, the triglyceride is further defined as epoxidized linseed oil. Those skilled in the art recognize that linseed oil is a glyceride of linolenic, linoleic, and oleic acids, which are each fatty acids.

The triglyceride is present in an amount of from 0.01 to 10 parts by weight, preferably form 0.01 to 7.5 parts by weight, and more preferably from 0.05 to 2.5 parts by weight, each based on 100 parts by weight of the composition. The amount of the triglyceride present in the composition helps to ensure that the carboxyl groups do not catalyze the hydrolysis reaction.

The epoxy component has internal aromatic groups and at least one terminal epoxy group for reacting with the carboxyl groups. The presence of the epoxy component further improves the resistance of the composition to hydrolysis by forming ether linkages similar to that of the triglyceride described above. The epoxy component may also act as a chain extender if the polyalkylene terephthalate does undergo hydrolysis. Preferably, the epoxy component has two terminal epoxy groups and a number-average molecular weight of from about 100 to about 1000.

Preferably, the epoxy component is selected from at least one of bisphenol diglycidyl ethers, diglycidyl adducts of amines and amides, diglycidyl adducts of carboxylic acids, bis(3,4-epoxycyclohexylmethyl)adipate, and vinylcyclohexene di-epoxide. It is to be appreciated that various combination and mixtures of the above epoxy components may also be utilized with the subject invention. More preferably, the epoxy component is 2,2-bis[4-(2,3-epoxypropoxy)phenyl]propane, more commonly referred to as diglycidyl ether of Bisphenol A.

The epoxy component may be made by techniques well known to those skilled in the art. Preferably, the epoxy component is a reaction product of bisphenol A with epichlorohydrin. The epoxy component is present in an amount of from 0.01 to 10 parts by weight, preferably form 0.01 to 7.5 parts by weight, and more preferably from 0.05 to 2.5 parts by weight, each based on 100 parts by weight of the composition. The amount of the epoxy component present in the composition, in combination with the triglyceride, helps to ensure that the carboxyl groups do not catalyze the hydrolysis reaction.

The subject invention may further comprise fibers selected from at least one of glass fibers, polyamide fibers, cellulose fibers, and ceramic fibers. It is to be appreciated that various combination and mixtures of the above fibers may also be utilized with the subject invention. The fibers preferably have a surface-active agent comprising epoxy groups for reacting with the carboxyl groups. The epoxy groups of the surface-active agent creates ether linkages with the carboxyl groups and also reduces the possibility of the fiber absorbing water to effectuate the hydrolysis reaction. The fibers are present in an amount of from 5 to 60 parts by weight, preferably from 20 to 40 parts by weight, and more preferably about 30 parts by weight. The reaction between the surface-active agent and the polyalkylene terephthalate also ensures that the fiber has good adhesion thereby improving the physical properties of the article formed therefrom. Preferably, the sizing agent comprises a polyurethane structure and more preferably is a reaction product of bis(cyclohexylisocyanato) methane, 1,6-hexanediol and adipic acid polyester, and bisphenol glycidyl ether. However, other sizing agents may be used with the subject invention.

As described above, the composition also includes the inert components. The inert components, while generally not reacting with the reactive components, improve the processability of the composition. The plasticizer comprises an esterification product of a polyoxyalkylene glycol with 1 to 20 carbon atoms and an aliphatic carboxylic acid with 1 to 25 carbon atoms for improving melt flow properties and for reducing hydrolysis of the composition. Said another way, the polyoxyalkylene glycol is end-capped with the aliphatic carboxylic acid such that the plasticizer only includes one or two ester linkages.

The polyoxyalkylene glycol is selected from at least one of diethylene glycol, triethylene glycol, and polyethylelne glycol having a number-average molecular weight greater than about 150. It is to be appreciated that various combination and mixtures of the above polyoxyalkylene glycols may also be utilized with the subject invention. The polyoxyalkylene glycol has a plurality of internal ether linkages that are hydrophobic and the polyoxyalkylene glycol acts as a buffer to prevent hydrolysis of the composition. Preferably, the polyoxyalkylene glycol is polyethylene glycol have a molecular weight of about 300.

The aliphatic carboxylic acid is preferably a saturated monocarboxylic acid having a straight or branched chain with 1 to 10 carbon atoms. The saturated monocarboxylic acid is selected from at least one of acetic acid, propionic acid, butyric acid, valeric acid, caproic acid, caprylic acid, capric acid, 2-ethylhexanoic acid, 2-methylhexanoic acid, 3-methylhexanoic acid, 4-methylhexanoic acid, 5-methylhexanoic acid, isooctonoic acid, 2-methylpropionic acid, 2-methylbutanoic acid, 2-ethylbutyric acid, 2-methylpentanoic acid, 3-methylpentanoic acid, and 4-methylpentanoic acid. It is to be appreciated that various combination and mixtures of the above acids may also be utilized with the subject invention. More preferably, the saturated monocarboxylic acid is 2-ethylhexanoic acid. Since 2-ethylhexanoic acid only has a single carboxylic acid group, the polyethylene glycol is end-capped with the 2-ethylhexanoic acid.

The plasticizer is present in an amount of from 0.01 to 10 parts by weight, preferably from 0.01 to 7.5 parts by weight, and more preferably from 0.01 to 5 parts by weight, each based on 100 parts by weight of the composition. The amount of the plasticizer is chosen to ensure the processability of the composition while also improving the hydrolysis resistance of the composition.

The lubricant is an ester or amide of saturated aliphatic carboxylic acids having from 10 to 40 carbon atoms and saturated aliphatic alcohols or amines having from 2 to 40 carbon atoms. The lubricant typically includes fatty acid chains that are highly hydrophobic that aid in the hydrolysis resistance of the composition. Preferably, the lubricant is pentaerythritol tetrastearate. The lubricant is present in an amount of from 0.01 to 5 parts by weight, preferably from 0.01 to 3 parts by weight, and more preferably from 0.01 to 2 parts by weight, each based on 100 parts by weight of the composition.

The composition may also comprise a thermal antioxidant having a sterically hindered phenolic group. Those skilled in the art appreciate that various thermal antioxidants are available to stabilize the composition without discoloring and to prevent thermo-oxidative degradation. Preferably, the thermal antioxidant is selected from at least one of pentaerythritol tetrakis (3-(3,5-di-tert-butyl-4-hydroxyphenyl) propionate), tetrakis (methylene-3-(3',5'-di-tert-butyl-4'-hydroxyphenyl)propionate)methane, octadecyl-3-(3',5'-di-tert-butyl-4'-hydroxyphenyl)propionate, 1,3,5-trimethyl-2,4,6-tris(3,5-di-tert-butyl-4-hydroxybenzyl)benzene, and 4,4'-(2,2-diphenylpropyl) diphenylamine. It is to be appreciated that various combination and mixtures of the above thermal antioxidants may also be utilized with the subject invention. More preferably, the thermal antioxidant is pentaerythritol tetrakis (3-(3,5-di-tert-butyl-4-hydroxyphenyl)propionate). The thermal antioxidant is present in an amount of from 0.01 to 5 parts by weight, preferably from 0.01 to 3 parts by weight, and more preferably from 0.01 to 1.5 parts by weight, each based on 100 parts by weight of the composition.

The composition may further include additional additives known to those skilled in the art, such as nucleating agents, pigments, flame-retardants, and the like. For example, the composition may include a nucleating agent selected from at least one of talc, kaolin, mica, calcium sulfate, and barium sulfate. It is to be appreciated that various combination and mixtures of the above nucleating agents may also be utilized with the subject invention. The nucleating agent is present in an amount of from 0.01 to 2 parts by weight, preferably from 0.01 to 1 parts by weight, and more preferably from 0.01 to 0.5 parts by weight, each based on 100 parts by weight of the composition. The nucleating agent provides for increased crystallization of the composition.

The pigment may include inorganic or organic compounds and may impart a special effect and/or color to article. The pigment may also be dispersed in a carrier matrix, such as a plastic resin, as understood by those skilled in the art. Preferably, the pigment is carbon black pigment. The pigment is present in an amount of from 0.05 to 5 parts by weight, preferably from 0.5 to 3 parts by weight, and most preferably from 0.5 to 1.5 parts by weight, each based on 100 parts by weight of the composition. The amount of the pigment includes the amount of the carrier matrix, if any. Preferably, the pigment is present in an amount of from 10 to 50 wt % based on 100 wt % of the combined pigment and carrier matrix.

One typical process of preparing the composition includes dry blending the components followed by pelletizing to form pellets. The pellets are preferably extruded, but other methods would also suffice to form the pellets. The pellets are then heated and molded into the article. The article may be formed via extrusion processes or injection molding processes.

The following examples, illustrating the formation of the article according to the subject invention, as presented herein, are intended to illustrate and not limit the invention.

EXAMPLES

The composition according to the subject invention was formed from the components listed in Table 1 as parts by weight, unless otherwise indicated.

TABLE 1

Formulations of Composition

| Component | Example 1 | Example 2 | Comparative Example 1 | Comparative Example 2 |
|---|---|---|---|---|
| Polyalkylene terephthalate A | 61.6 | 42.1 | — | — |
| Polyalkylene terephthalate B | — | — | 63.0 | — |
| Polyalkylene terephthalate C | — | — | — | 68.3 |
| Recycled PET | — | 21.0 | — | — |
| Modifier | — | — | 6.0 | 0.5 |
| Triglyceride | 2.0 | 2.0 | — | — |
| Epoxy Component | 1.0 | 1.0 | — | — |
| Fibers | 30.0 | 30.0 | 30.0 | 30.0 |
| Lubricant | 0.5 | 0.5 | — | — |
| Plasticizer | 3.0 | 1.5 | — | — |
| Thermal Antioxidant | 0.3 | 0.3 | — | — |
| Nucleating Agent | 0.1 | 0.1 | — | — |
| Pigment | 1.5 | 1.5 | 1.0 | 1.2 |
| TOTAL | 100.0 | 100.0 | 100.0 | 100.0 |

Polyalkylene terephthalate A: PBT, commercially available as Ultradur® B2550 from BASF Corporation.

Polyalkylene terephthalate B: PBT, commercially available as Ultradur® B4500 from BASF Corporation. Ultradur® B4500 has a lower melt index and a higher viscosity than Ultradur® B2550. Ultradur® B4500 is known to have good resistance to hydrolysis and therefore is used to compare the hydrolysis resistance of the subject invention thereto.

Polyalkylene terephthalate C: PBT, commercially available as Ultradur® B4300 from BASF Corporation. Ultradur® B4300 is not known to have good resistance to hydrolysis and is included to illustrate the amount of hydrolysis that occurs in non-hydrolysis resistant compositions.

Recycled PET is commercially available as UltraPET from WTE Recycling Corp.

Modifier: terpolymer of ethylene, butyl acrylate, and glycidyl methacrylate, commercially available as Lotader from Atofina.

Triglyceride: epoxidized linseed oil, commercially available as Vikoflex® 7190 from Atofina.

Epoxy Component: 2,2-bis[4-(2,3-epoxypropoxy)phenyl] propane, commercially available as Araldite® from Huntsman Chemical.

Fibers: Glass fibers having a surface-active agent including epoxy groups, commercially available from Asahi Glass Company.

Lubricant: pentaerythritol tetrastearate, commercially available as Loxiol VPG 861 from Cognis Corporation.

Plasticizer: an ethylhexanoic acid diester of polyethylene glycol, commercially available as Plast 7071 from CP Hall.

Thermal Antioxidant: pentaerythritol tetrakis (3-(3,5-di-tert-butyl-4-hydroxyphenyl)propionate), commercially available as Irganox® from Ciba.

Nucleating Agent: talc, commercially available as Talc IT

Pigment: 20 wt % carbon black pigment dispersed in PBT, commercially available as BP 880 in PBT from BASF Corporation The above compositions underwent a compounding operation as understood by those skilled in the art. The compounding operation dry blends the components together and then compounds the components in a twin screw extruder at a temperature of about 250° C. and at about 250 revolutions per minute. The twin screw extruder extrudes a product that is cooled, preferably in a water bath, and then the product is pelletized. The pellets are then dried for about 4 hours at 110° C.

The pelletized product is then molded into an article for testing. The article may have various shapes depending upon the desired test. For example, the pelletized product may be molded into tensile bars to test the tensile properties or may be molded into flexural bars to test the flexural properties. The following tests were conducted on the samples and the physical properties were determined: viscosity number, melt index in accordance with ASTM D1208, tensile strength in accordance with ASTM D638, elongation in accordance with ASTM D638, flexural strength and modulus in accordance with ASTM D790, charpy impact in accordance with ASTM D256A.

The following tests were conducted on the article after molding and after the sample has been conditioned to determine the resistance to hydrolysis. The articles were exposed to a temperature of 110° C. and 100% relative humidity for ten days. The articles were removed from these conditions and the physical properties were tested again. The difference between the properties were converted to a percent retention for each property.

TABLE 2

Physical Properties

| Property | Example 1 | Example 2 | Comparative Example 1 | Comparative Example 2 |
|---|---|---|---|---|
| Melt Index | 8.7 | 9.5 | 2.5 | N/A |
| Viscosity Number (DAM) | | | | |
| Pre-conditioning | 105 | 90 | 114.0 | N/A |
| Post-conditioning | 100 | 78 | 51.0 | N/A |
| % Retention | 95% | 86% | 45.0 | N/A |
| Tensile Strength, Mpa | | | | |
| Pre-conditioning | 126.0 | 137.0 | 131.0 | 139.0 |
| Post-conditioning | 115.0 | 84.0 | 80.0 | 42.0 |
| % Retention | 91.3 | 61.3 | 61.0 | 30.2 |
| Tensile Elongation at break, % | | | | |
| Pre-conditioning | 3.4 | 2.8 | 3.6 | 3.1 |
| Post-conditioning | 2.7 | 1.3 | 1.4 | 0.7 |
| % Retention | 80.0 | 45.1 | 40.0 | 22.6 |
| Charpy Impact, kJ/m$^2$ | | | | |
| Pre-conditioning | 12.00 | 10.4 | 13.8 | 70.5 |
| Post-conditioning | 9.70 | 7.7 | 7.9 | 9.0 |
| % Retention | 81.0 | 74.0 | 57.0 | 12.8 |

Referring to the physical properties of Table 2, Example 1 has a percent retention for each of the properties of at least 80%. This indicates that Example 1 has undergone little hydrolysis and has a good resistance to hydrolysis. Example 2 has sufficient retention for the charpy impact strength and tensile strength, however, the elongation retention is less than 50%. Without intending to be bound to theory, it is believed that these lower retentions are a result of the polyethylene terephthalate included in the composition, as well as, the reduced amount of plasticizer. Even though the plasticizer is an inert component, as described above, the plasticizer acts as a buffer to prevent hydrolysis.

Referring to the Comparative Example 1, Ultradur® 4500 is PBT with terminal carboxyl groups and hydroxyl groups, but it has a higher melt index and a higher viscosity. Without adding the triglyceride, the epoxy component, and the plasticizer, the article undergoes significant hydrolysis, even though Ultradur® 4500 is considered a hydrolysis resistant composition. This is observed by the percent of retention of the physical properties. While the article retained about 61% of the tensile strength, the elongation and the charpy impact retained less than 60% of their original values. Based upon these values, the Comparative Example 1 has a hydrolysis-resistance that is marginally satisfactory for articles that are exposed to continuous conditions causing hydrolysis.

Referring to the Comparative Example 2, Ultradur® 4300 is known to be a non-hydrolysis resistant composition. When exposed to sufficient conditions, the compositions undergoes significant hydrolysis. This is especially observed by the percent of retention of the physical properties. The article retained about 30.2% of the tensile strength and less than 30% of the elongation and the charpy impact strength.

One feature of the subject invention is to provide hydrolysis resistant compositions that have sufficient physical properties without having to include impact modifiers. Both Comparative Example 1 and 2 include an impact modifier and the resultant charpy impact strength is 7.9 kJ/m$^2$ and 9.0 kJ/m$^2$, respectively. Impact modifier is expensive and increases the cost of manufacturing articles from such compositions. Therefore, it was advantageous to eliminate the impact modifier, while obtaining satisfactory physical properties. Examples 1 and 2 do not include any impact modifiers and have charpy impact strengths of 9.7 kJ/m$^2$ and 7.7 kJ/m$^2$, respectively, which is equal to or exceeds the Comparative Examples.

Each of these samples from Examples 1 and 2 and the Comparative Example was then tested in compliance with United States Council for Automotive Research (USCAR) class 3. USCAR class 3 testing involves cyclic conditioning of the samples where the temperature is varied from −40 to 125 C. and the humidity is varied from 10 to 95%. The duration of each cycle is 8 hours and the total exposure time is 320 hours. The samples are tested after conditioning and before conditioning and the samples have to retain at least 80% of its original properties to meet the USCAR 3 classification. The USCAR class 3 conditions are less stringent than the test described above and the results are illustrated in Table 2. Therefore, a composition may pass USCAR class 3 test, while still not be desirable for use in conditions more likely to cause hydrolysis. The following table illustrates the physical properties measured before and after exposure to these conditions. Since Comparative Example 2 is not a known hydrolysis resistant composition, it was not tested under the less stringent USCAR class 3 conditions.

TABLE 3

USCAR Class 3 Physical Properties

| Property | Example 1 | Example 2 | Comparative Example 1 |
|---|---|---|---|
| Melt Index | 8.7 | 9.5 | 2.5 |
| Viscosity Number (DAM) | | | |
| Pre-conditioning | 102.0 | 86.0 | 114.0 |
| Post-conditioning | 106.0 | 88.0 | 51.0 |
| % Retention | 104.0 | 102.0 | 45.0 |
| Tensile Strength, Mpa | | | |
| Pre-conditioning | 126 | 137 | 128 |
| Post-conditioning | 127 | 136 | 122 |
| % Retention | 100.8 | 99.3 | 95.4 |
| Tensile Elongation at break, % | | | |
| Pre-conditioning | 3.4 | 2.8 | 3.7 |
| Post-conditioning | 3.1 | 2.5 | 3.0 |
| % Retention | 92 | 87 | 83 |
| Charpy Impact, kJ/m$^2$ | | | |
| Pre-conditioning | 66.0 | 62.5 | 80 |
| Post-conditioning | 63.9 | 52.1 | 64 |
| % Retention | 97 | 84.4 | 80 |

In order to pass the USCAR class 3 test, the article had to have a retention of at least 80% for each of the properties. From Table 3, each Example and Comparative Example 1 passes the USCAR class 3 test. Therefore, each of the compositions would be certified USCAR class 3. The product needs to meet the USCAR 3 requirements so that they can be commercialized in the automotive connector applications. As discussed above, the charpy impact strength of Examples 1 and 2 are similar to that of Comparative Example 1, even though Comparative Example 1 includes the impact modifier and Examples 1 and 2 do not. Therefore, in addition to providing improved hydrolysis-resistance, Examples 1 and 2 are less costly to manufacture than Comparative Example 1.

Obviously, many modifications and variations of the present invention are possible in light of the above teachings. The invention may be practiced otherwise than as specifically described within the scope of the appended claims.

What is claimed is:

1. A composition comprising:
   a polyalkylene terephthalate and/or polyester thereof having terminal carboxyl groups and hydroxyl groups and internal ester linkages;
   a triglyceride having at least one acid component with 6 to 30 carbon atoms and at least one epoxy group for reacting with said carboxyl groups;
   an epoxy component having internal aromatic groups and at least one terminal epoxy group for reacting with said carboxyl groups; and
   a plasticizer comprising an esterification product of a polyoxyalkylene glycol with 1 to 20 carbon atoms and an aliphatic carboxylic acid with 1 to 25 carbon atoms for improving melt flow properties and for reducing hydrolysis of said composition.

2. A composition as set forth in claim 1 wherein said acid component of said triglyceride is selected from at least one of linseed oil, soybean oil, sunflower seed oil, safflower oil, hempseed oil, tung oil, oiticica oil, corn oil, sesame oil, cottonseed oil, castor oil, olive oil, peanut oil, rapeseed oil, coconut oil, babassu oil, and palm oil.

3. A composition as set forth in claim 2 wherein said triglyceride has a number-average molecular weight of from about 400 to about 1000.

4. A composition as set forth in claim 3 wherein said triglyceride is further defined as epoxidized linseed oil.

5. A composition as set forth in claim 1 wherein said epoxy component has two terminal epoxy groups.

6. A composition as set forth in claim 5 wherein said epoxy component has a number-average molecular weight of from about 100 to about 1000.

7. A composition as set forth in claim 6 wherein said epoxy component is selected from at least one of bisphenol diglycidyl ethers, diglycidyl adducts of amines and amides, diglycidyl adducts of carboxylic acids, bis(3,4-epoxycyclohexylmethyl)adipate, and vinylcyclohexene di-epoxide.

8. A composition as set forth in claim 7 wherein said epoxy component is a reaction product of bisphenol A with epichlorohydrin.

9. A composition as set forth in claim 1 wherein said polyoxyalkylene glycol is selected from at least one of diethylene glycol, triethylene glycol, and polyethylelne glycol having a number-average molecular weight greater than about 150.

10. A composition as set forth in claim 1 wherein said aliphatic carboxylic acid is further defined as a saturated monocarboxylic acid having a straight or branched chain with 1 to 10 carbon atoms.

11. A composition as set forth in claim 10 wherein said saturated monocarboxylic acid is selected from at least one of acetic acid, propionic acid, butyric acid, valeric acid, caproic acid, caprylic acid, capric acid, 2-ethylhexanoic acid, 2-methylhexanoic acid, 3-methylhexanoic acid, 4-methylhexanoic acid, 5-methylhexanoic acid, isooctonoic acid, 2-methylpropionic acid, 2-methylbutanoic acid, 2-ethylbutyric acid, 2-methylpentanoic acid, 3-methylpentanoic acid, and 4-methylpentanoic acid.

12. A composition as set forth in claim 1 further comprising fibers selected from at least one of glass fibers, polyamide fibers, cellulose fibers, and ceramic fibers.

13. A composition as set forth in claim 12 wherein said fibers are further defined as having a surface-active agent comprising epoxy groups for reacting with said carboxyl groups.

14. A composition as set forth in claim 1 further comprising a lubricant being an ester or amide of saturated aliphatic carboxylic acids having from 10 to 40 carbon atoms and saturated aliphatic alcohols or amines having from 2 to 40 carbon atoms.

15. A composition as set forth in claim 14 wherein said lubricant is further defined as pentaerythritol tetrastearate.

16. A composition as set forth in claim 1 further comprising a thermal antioxidant having a sterically hindered phenolic group.

17. A composition as set forth in claim 16 wherein said thermal antioxidant is selected from at least one of pentaerythritol tetrakis (3-(3,5-di-tert-butyl-4-hydroxyphenyl) propionate); tetrakis(methylene-3-(3',5'-di-tert-butyl-4'-hydroxyphenyl)propionate)methane; octadecyl-3-(3',5'-di-tert-butyl-4'-hydroxyphenyl)propionate; 1,3,5-trimethyl-2,4,6-tris(3,5-di-tert-butyl-4-hydroxybenzyl)benzene; and 4,4'-(2,2-diphenylpropyl)diphenylamine.

18. A composition as set forth in claim 1 further comprising a nucleating agent selected from at least one of talc, kaolin, mica, calcium sulfate, and barium sulfate.

19. An article formed in accordance with said composition set forth in claim 1.

* * * * *